(12) United States Patent
Nakadate et al.

(10) Patent No.: US 11,155,015 B2
(45) Date of Patent: Oct. 26, 2021

(54) SYNTHETIC RESIN MICROPOROUS FILM AND MANUFACTURING METHOD THEREOF, AND SEPARATOR FOR POWER STORAGE DEVICE AND POWER STORAGE DEVICE

(71) Applicant: SUMITOMO CHEMICAL COMPANY, LIMITED, Tokyo (JP)

(72) Inventors: Junichi Nakadate, Osaka (JP); Kazunari Yagi, Ibaraki (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 19 days.

(21) Appl. No.: 16/484,667

(22) PCT Filed: Feb. 8, 2018

(86) PCT No.: PCT/JP2018/004499
§ 371 (c)(1),
(2) Date: Aug. 8, 2019

(87) PCT Pub. No.: WO2018/147395
PCT Pub. Date: Aug. 16, 2018

(65) Prior Publication Data
US 2020/0014012 A1 Jan. 9, 2020

(30) Foreign Application Priority Data
Feb. 9, 2017 (JP) .............. JP2017-022339

(51) Int. Cl.
*H01M 2/16* (2006.01)
*B29C 55/06* (2006.01)
(Continued)

(52) U.S. Cl.
CPC ........ *B29C 48/305* (2019.02); *B29C 48/0018* (2019.02); *B29C 48/08* (2019.02);
(Continued)

(58) Field of Classification Search
CPC ........ H01M 2/16; H01M 2/14; H01M 2/1653; H01M 2/162; H01M 2/145; B29C 48/00;
(Continued)

(56) References Cited

U.S. PATENT DOCUMENTS

| | | | | |
|---|---|---|---|---|
| 2011/0117439 A1* | 5/2011 | Yamada | ............ | B01D 71/26 429/254 |
| 2013/0011716 A1* | 1/2013 | Sano | ............ | B32B 27/34 429/145 |

FOREIGN PATENT DOCUMENTS

| | | |
|---|---|---|
| JP | 63-199742 | 8/1988 |
| JP | 10-100344 | 4/1998 |

(Continued)

OTHER PUBLICATIONS

JP 2015017249 MT (Year: 2015).*
International Search Report dated May 15, 2018 in International (PCT) Application No. PCT/JP2018/004499.

*Primary Examiner* — Alexander Usyatinsky
(74) *Attorney, Agent, or Firm* — Wenderoth, Lind & Ponack, L.L.P.

(57) ABSTRACT

The present invention provides a synthetic resin microporous film which has excellent permeability of lithium ions, can constitute high performance power storage devices, and is less likely to cause a short circuit between a positive electrode and a negative electrode as well as rapid decrease in discharge capacity due to a dendrite even when used in high power applications. The synthetic resin microporous film of the present invention is a synthetic resin microporous film comprising a synthetic resin, the synthetic resin microporous film being stretched, the synthetic resin microporous film having, in a cross section along a thickness direction and a stretching direction of the synthetic resin microporous film: a plurality of support portions extending in the thickness direction of the synthetic resin microporous (Continued)

film; a plurality of fibrils formed between the support portions; and the support portions having the number of branch structures of 150 or less per 100 $\mu m^2$; and the synthetic resin microporous film being configured such that micropore portions are formed in areas surrounded by the support portions and the fibrils.

5 Claims, 3 Drawing Sheets

(51) Int. Cl.
  *B29C 48/305* (2019.01)
  *B29C 48/08* (2019.01)
  *B29C 48/00* (2019.01)
  *B29C 71/02* (2006.01)
  *C08J 5/18* (2006.01)
  *H01G 9/00* (2006.01)
  *H01G 9/02* (2006.01)
  *H01G 11/52* (2013.01)
  *H01G 11/84* (2013.01)
  *H01M 50/403* (2021.01)
  *H01M 50/411* (2021.01)
  *B29K 23/00* (2006.01)
  *B29K 105/04* (2006.01)
  *B29L 31/34* (2006.01)

(52) U.S. Cl.
  CPC .............. *B29C 55/06* (2013.01); *B29C 71/02* (2013.01); *C08J 5/18* (2013.01); *H01G 9/0032* (2013.01); *H01G 9/02* (2013.01); *H01G 11/52* (2013.01); *H01G 11/84* (2013.01); *H01M 50/403* (2021.01); *H01M 50/411* (2021.01); *B29C 2071/022* (2013.01); *B29K 2023/12* (2013.01); *B29K 2105/041* (2013.01); *B29L 2031/3468* (2013.01); *C08J 2323/12* (2013.01)

(58) Field of Classification Search
  CPC ....... B29C 48/08; B29C 48/305; B29C 55/06; B29C 71/02; B29C 48/0018; B29C 2071/022; B29C 55/065; C08J 5/18; C08J 9/00; C08J 2323/12; H01G 11/52; H01G 11/84; H01G 9/00; H01G 9/02; H01G 9/0032; B29D 7/01; Y02E 60/10; B29K 2023/12; B29K 2105/041; B29L 2031/3468
  See application file for complete search history.

(56) References Cited

FOREIGN PATENT DOCUMENTS

| | | | |
|---|---|---|---|
| JP | 2003-109570 | | 4/2003 |
| JP | 2007-273443 | | 10/2007 |
| JP | 2011-527710 | | 11/2011 |
| JP | 2013-100487 | | 5/2013 |
| JP | 2015-17249 | | 1/2015 |
| JP | 2015017249 | * | 1/2015 |
| JP | 2015-120835 | | 7/2015 |
| JP | 2015120835 | * | 7/2015 |
| WO | 2011/118735 | | 9/2011 |

* cited by examiner

SYNTHETIC RESIN MICROPOROUS FILM AND MANUFACTURING METHOD THEREOF, AND SEPARATOR FOR POWER STORAGE DEVICE AND POWER STORAGE DEVICE

TECHNICAL FIELD

The present invention relates to a synthetic resin microporous film and a manufacturing method thereof, and a separator for power storage devices and a power storage device.

BACKGROUND ART

Power storage devices such as lithium ion batteries, capacitors, and condensers are conventionally used. For example, a lithium ion battery generally includes, in an electrolytic solution, a positive electrode, a negative electrode, and a separator. The positive electrode is obtained by applying lithium cobalt oxide or lithium manganese oxide on the surface of an aluminum foil. The negative electrode is obtained by applying carbon on the surface of a copper foil. The separator serves as a partition between the positive electrode, and the negative electrode to prevent a short circuit between the positive electrode and the negative electrode.

While a lithium ion battery is charged, lithium ions are released from the positive electrode and enters the negative electrode. On the other hand, while a lithium ion battery is discharged, lithium ions are released from the negative electrode and moves to the positive electrode. Such charge and discharge is repeated in a lithium ion battery. Therefore, a separator used in a lithium ion battery is required to favorably transmit lithium ions.

Repeated charge and discharge of a lithium ion battery causes generation of a dendrite (dendritic crystal) of lithium on the edge face of a negative electrode. This dendrite smashes through a separator and causes a minute short circuit (dendrite short circuit) between a positive electrode and a negative electrode.

In recent years, the power of a large-sized battery such as a lithium ion battery for automobiles has been increased, and there is a demand for decreasing resistance to permeation of lithium ions through a separator. Therefore, a separator is required to have high gas permeability. Furthermore, it is also important for large-sized lithium ion batteries to reliably have long lifetime and long-term safety.

Various porous films formed from polypropylene have been proposed as a separator. For example, Patent Literature 1 proposes a manufacturing method of a polypropylene microporous film which includes extruding a composition containing polypropylene, a polymer having a melt crystallization temperature higher than that of polypropylene, and a β crystal nucleating agent to mold it into a sheet shape, and thereafter performing at least uniaxial stretching.

Also, Patent Literature 2 proposes a multilayer porous membrane which includes, on at least one face of a polyolefin resin porous membrane, a porous layer containing an inorganic filler or a resin with a melting point and/or glass transition temperature of 180° C. or higher and having a thickness of 0.2 μm or more and 100 μm or less, and which has a degree of gas permeability of 1 to 650 sec/100 cc.

Furthermore, Patent Literature 3 discloses a manufacturing method of a porous polypropylene film including uniaxially stretching a polypropylene film to obtain a porous film.

CITATION LIST

Patent Literature

Patent Literature 1: Japanese Patent Application Laid-Open No. Sho. 63-199742
Patent Literature 2: Japanese Patent Application Laid-Open No. 2007-273443
Patent Literature 3: Japanese Patent Application Laid-Open No. Hei. 10-100344

SUMMARY OF INVENTION

Technical Problem

However, the polypropylene microporous film obtained by the manufacturing method of a polypropylene microporous film disclosed in Patent Literature 1 has low gas permeability and insufficient permeability of lithium ions. Therefore, such a polypropylene microporous film is difficult to adopt in lithium ion batteries which require high power.

Also, the multilayer porous membrane of Patent Literature 2 has insufficient permeability of lithium ions, and is therefore difficult to adopt in lithium ion batteries which require high power.

Furthermore, in the porous polypropylene film obtained by the method of Cited Literature 3, pores are not uniformly formed, which causes non-uniform permeability of lithium ions. Accordingly, the porous polypropylene film contains both a site having high permeability of lithium ions and a site having low permeability thereof. In such a porous polypropylene film, a dendrite occurs in a site having high permeability of lithium ions, which is likely to cause a minute short circuit. Thus, the porous polypropylene film has a problem in that long lifetime and long-term safety are not sufficient.

The present invention provides a synthetic resin microporous film which has excellent permeability of lithium ions, can constitute power storage devices such as high performance lithium ion batteries, capacitors, and condensers, and is less likely to cause a short circuit between a positive electrode and a negative electrode as well as rapid decrease in discharge capacity due to a dendrite even when used in high power applications. The present invention also provides a manufacturing method thereof.

Solution to Problem

[Synthetic Resin Microporous Film]
The synthetic resin microporous film of the present invention is
a synthetic resin microporous film comprising a synthetic resin, the synthetic resin microporous film being stretched,
the synthetic resin microporous film having: a plurality of support portions extending in a thickness direction of the synthetic resin microporous film; and a plurality of fibrils formed between the support portions, the support portions and the fibrils being observed in a cross section along the thickness direction and a stretching direction of the synthetic resin microporous film,
the synthetic resin microporous film being configured such that micropore portions are formed in areas surrounded by the support portions and the fibrils, and such that the number of branch structures of the support portions is 150 or less per 100 μm².

The synthetic resin microporous film includes the synthetic resin. As a synthetic resin, an olefin-based resin is preferable. An ethylene-based resin and a propylene-based resin are preferable, and a propylene-based resin is more preferable.

Examples of the propylene-based resin include a homopolypropylene and copolymers of propylene and another olefin. A homopolypropylene is preferable in producing the synthetic resin microporous film by the stretching method. The propylene-based resins may be used alone or in combination of two or more thereof. The copolymer of propylene and another olefin may be either a block copolymer or a random copolymer. The contained amount of the propylene component in the propylene-based resin is preferably 50% by mass or more, and more preferably 80% by mass or more.

Examples of the olefins copolymerized with propylene include α-olefins such as ethylene, 1-butene, 1-pentene, 4-methyl-1-pentene, 1-hexene, 1-octene, 1-nonene, and 1-decene. Ethylene is preferable.

Examples of the ethylene-based resin include an ultra-low-density polyethylene, a low-density polyethylene, a linear low-density polyethylene, a medium-density polyethylene, a high-density polyethylene, an ultra-high-density polyethylene, and an ethylene-propylene copolymer. Moreover, the ethylene-based resin microporous film may contain another olefin-based resin as long as the film contains an ethylene-based resin. The contained amount of the ethylene component in the ethylene-based resin is preferably more than 50% by mass, and more preferably 80% by mass or more.

The weight-average molecular weight of the olefin-based resin is not particularly limited, and is preferably 30,000 to 500,000, and more preferably 50,000 to 480,000. The weight-average molecular weight of the propylene-based resin is not particularly limited, and is preferably 250,000 to 500,000, and more preferably 280,000 to 480,000. The weight-average molecular weight of the ethylene-based resin is not particularly limited, and is preferably 30,000 to 250,000, and more preferably 50,000 to 200,000. The olefin-based resin having the weight-average molecular weight falling within the aforementioned range can provide a synthetic resin microporous film having excellent film formation stability and the micropore portions that are uniformly formed.

The molecular weight distribution (weight-average molecular weight Mw/number-average molecular weight Mn) of the olefin-based resin is not particularly limited, and is preferably 5 to 30, and more preferably 7.5 to 25. The molecular weight distribution of the propylene-based resin is not particularly limited, and is preferably 7.5 to 12, and more preferably 8 to 11. The molecular weight distribution of the ethylene-based resin is not particularly limited, and is preferably 5.0 to 30, and more preferably 8.0 to 25. The olefin-based resin having a molecular weight distribution falling within the aforementioned range can provide a synthetic resin microporous film having a high surface aperture ratio and excellent mechanical strength.

Herein, the weight-average molecular weight and the number-average molecular weight of the olefin-based resin are polystyrene-equivalent values measured by a GPC (gel permeation chromatography) method. Specifically, 6 to 7 mg of an olefin-based resin is collected, and is supplied to a test tube. Then, an o-DCB (ortho-dichlorobenzene) solution containing 0.05-mass % BHT (dibutylhydroxytoluene) is added into the test tube, thereby diluting the solution to have the olefin-based resin concentration of 1 mg/mL. As a result, a diluted liquid is prepared.

The diluted liquid described above is shaken at 145° C. for 1 hour using a dissolution filtration apparatus at a rotational speed of 25 rpm to dissolve the olefin-based resin in the o-DCB solution to obtain a measurement sample. The weight-average molecular weight and the number-average molecular weight of the olefin-based resin can be measured by the GPC method using this measurement sample.

The weight-average molecular weight and the number-average molecular weight of the olefin-based resin may be measured, for example, with the following measuring device and under the following measuring conditions.

Measuring device: trade name "HLC-8121GPC/HT" manufactured by TOSOH Corporation,
Measuring conditions:
Column: TSKgelGMHHR-H(20)HT×3
  TSKguardcolumn-HHR (30) HT×1
Mobile phase: o-DCB 1.0 mL/min
Sample concentration: 1 mg/mL
Detector: Bryce-type refractometer
Standard substance: Polystyrene (manufactured by TOSOH Corporation, molecular weight: 500 to 8420000)
Elution conditions: 145° C.
SEC temperature: 145° C.

The melting point of the olefin-based resin is not particularly limited, and is preferably 130 to 170° C., and more preferably 133 to 165° C. The melting point of the propylene-based resin is not particularly limited, and is preferably 160 to 170° C., and more preferably 160 to 165° C. The melting point of the ethylene-based resin is not particularly limited, and is preferably 130 to 140° C., and more preferably 133 to 139° C. The olefin-based resin having a melting point falling within the aforementioned range can provide a synthetic resin microporous film having excellent film formation stability and capable of suppressing a decrease in mechanical strength at high temperatures.

It is noted that in the present invention, the melting point of the olefin-based resin, can be measured according to the following procedure using a differential scanning calorimeter (for example, device name "DSC220C" manufactured by Seiko Instruments Inc. or the like). First, 10 mg of an olefin-based resin is heated from 25° C. to 250° C. at a temperature increasing rate of 10° C./min and held at 250° C. for 3 minutes. Next, the olefin-based resin is cooled from 250° C to 25° C. at a temperature decreasing rate of 10° C./min and held at 25° C. for 3 minutes. Subsequently, the olefin-based resin is reheated from 25° C. to 250° C. at a temperature increasing rate of 10° C./min, and the temperature at the top of the endothermic peak, in this reheating step is taken as the melting point of the olefin-based resin.

The synthetic resin microporous film includes micropore portions. The micropore portions preferably extend through the thickness direction of the film. This can impart excellent gas permeability to the synthetic resin microporous film. Such a synthetic resin microporous film can transmit ions such as lithium ions in the thickness direction thereof. It is noted that the thickness direction of the synthetic resin microporous film refers to a direction orthogonal to the main surface of the synthetic resin microporous film. The main surface of the synthetic resin microporous film refers to a surface having the largest area among the surfaces of the synthetic resin microporous film.

The micropore portions are formed in the synthetic resin microporous film by stretching. In a cross section along the thickness direction of the synthetic resin microporous film, the average pore diameter of the micropore portions is preferably 20 to 100 nm, more preferably 20 to 70 nm, and particularly preferably 30 to 50 nm.

The average pore diameter of the micropore portions refers to a value measured according to the following procedure. First, the synthetic resin microporous film is cut along the thickness direction and the stretching direction (along a surface which is orthogonal to the main surface of the synthetic resin microporous film and along the stretching direction). An enlarged photograph of the cut surface is taken at a magnification of 10,000 times through a scanning electron microscope (SEM). It is noted that the vertical direction of the enlarged photograph is adjusted to become the thickness direction, and the photographing location is set to the center section in the thickness direction. The entire range of the obtained enlarged photograph is defined as a measurement compartment.

A SEM photograph of the cut surface of the synthetic resin microporous film is taken according to the following procedure. First, the synthetic resin microporous film is reinforced with copper tape or the like for facilitating cutting. Thereafter, the film is cut using a cross section polisher (for example, a cross section polisher commercially available as trade name "IB-19500CP" from JEOL Ltd.). Next, for preventing the distortion of an image due to charge up, a metal film (for example, metal films such as gold, platinum, osmium, and carbon) is deposited on the cut surface. Thereafter, using a SEM (for example, & SEM commercially available as trade name "S-4800S" from Hitachi), the cut surface is photographed under the condition of an accelerating voltage of 1.0 kV. Although the measurement according to the above-described procedure enables a sharp enlarged photograph to be taken, the procedure is not limited to the above-described method, as long as a sharp enlarged photograph can be obtained.

Next, an oval which surrounds a micropore portion appearing in the enlarged photograph and has the shortest major axis and minor axis is drawn for each micropore portion. An arithmetic mean value of the length of the major axis and the length of the minor axis of this oval is defined as the pore diameter of the micropore portion. An arithmetic mean value of the pore diameters of the micropore portions located within the measurement compartment is defined as the average pore diameter of the micropore portions. It is noted that only the micropore portion which is entirely placed within the measurement compartment is to be measured.

In a cross section along the thickness direction and the stretching direction of the synthetic resin microporous film, that is, in the enlarged photograph taken according to the above-described procedure, a plurality of support portions 1 extend in the thickness direction of the synthetic resin microporous film, as illustrated in FIG. 1. Furthermore, a plurality of fibrils 2 run between the support portions 1. Micropore portions 3 are formed in a region surrounded by the support portions 1 and the fibrils 2. When the synthetic resin film is stretched in the stretching step of forming a microporous structure in the synthetic resin stretched film, a crack is caused to occur between lamellae of the synthetic resin film. Starting from this crack, a synthetic resin portion is stretched, and the fibrils 2 are formed. A synthetic resin portion not having been stretched in this stretching step becomes the support portion 1.

The fibril 2 refers to a synthetic resin portion obtained by stretching a synthetic resin in the stretching step so that the synthetic resin is oriented in the stretching direction and has a fibrous shape. The synthetic resin portion extends in a direction $D_2$ orthogonal to a thickness direction $D_1$ of a synthetic resin microporous film A and in a direction of 10° or less with respect to the direction $D_2$, and has a width in the thickness direction of the synthetic resin microporous film of 0.15 µm or less (see FIG. 2). In FIG. 2, $D_3$ indicates a direction of 10° with respect to the direction $D_2$ that is orthogonal to the thickness direction $D_1$ of the synthetic resin microporous film.

The support portion 1 refers to a synthetic resin portion which is other than the fibril 2 and has a width of 0.1 µm or more. The width of the synthetic resin portion refers to a length of a straight line L that has the shortest length passing through a point P defined as a measurement target and having both ends reaching the outer line of the synthetic resin portion. For example, in FIG. 1, the width of the synthetic resin portion at a point $P_1$ is the length of a straight line $L_1$. The width of the synthetic resin portion at a point $P_2$ is the length of a straight line $L_2$. The width of the support portion 1 is limited to 0.1 µm or more, because the support portion 1 having a width of less than 0.1 µm hardly has an influence on permeability of ions and the like.

In the synthetic resin microporous film, the number of branch structures of the support portions 1 is 150 or less, preferably 100 or less, more preferably 70 or less, and particularly preferably 50 or less, respectively, per 100 µm². The number of branch structures being 150 or less allows the support portions 1 to roughly linearly extend in the thickness direction of the synthetic resin, microporous film. Also, between the support portions 1 and 1, the micropore portions 3 are roughly linearly formed in a continuous manner in the thickness direction of the synthetic resin microporous film. Therefore, the support portions 1 hardly prevent ions and the like from passing through the thickness direction of the synthetic resin microporous film, and ions smoothly pass through the linearly continuing micropore portions. Thus, the synthetic resin microporous film is excellent in permeability of ions and the like.

Also, since the support, portions 1 roughly linearly extend in the thickness direction of the synthetic resin microporous film, it has high resistance to the compressive stress in the thickness direction of the synthetic resin microporous film. Therefore, in the synthetic resin microporous film, the micropore portions 3 are not crushed by pressure when in use, and excellent gas permeability is maintained for an extended period. Furthermore, a power storage device adopting the synthetic resin microporous film maintains high output over an extended period.

In this manner, the synthetic resin microporous film reliably has gas permeability of ions and the like in the linearly continuing micropore portions which are formed between the support portions 1 and 1. Furthermore, since the mechanical strength, especially the mechanical strength in the thickness direction, of the synthetic resin microporous film is reliably achieved in regions where the support portions 1 are formed, the micropcre portions 3 are prevented from disappearing due to the crushing in the thickness direction.

The synthetic resin microporous film includes the support portions 1 which roughly linearly extend in the thickness direction without being branched to the extent possible, and the micropore portions 3 which are continuously and linearly formed in the thickness direction to the extent possible. Accordingly, the synthetic resin microporous film is excellent in gas permeability and mechanical strength in the thickness direction while having a porosity similar to that of a known synthetic resin microporous film.

Particularly, since the synthetic resin microporous film includes the micropore portions which are roughly linearly and continuously formed in the thickness direction, it can smoothly transmit ions and the like. Therefore, the synthetic resin microporous film can be suitably used as a separator for power storage devices which require high power (such as lithium ion batteries, nickel hydrogen batteries, nickel cadmium batteries, nickel zinc batteries, silver zinc batteries, capacitors (electric double layer capacitors, lithium ion capacitors), and condensers).

The number of branch structures of the support portions 1 is measured according to the following procedure. First, a measurement compartment of an enlarged photograph is identified according a procedure similar to the measurement procedure of the average pore diameter of the micropore portions. Inside the measurement compartment, the number of branched portions (branch structures) of the support portions is counted. A value obtained by dividing the obtained number of branch structures by the area ($\mu m^2$) of the measurement compartment and multiplying the calculated value by 100 is defined as the number of branch structures of the support portions 1 per 100 $\mu m^2$.

Whether or not: the support portions 1 are branched is judged according to the following procedure. As illustrated in FIG. 3 and FIG. 4, a point 1c at which outer lines 11a and 11b of two support portions 1a and 1b intersect at a sharp angle in a connection portion between the two support portions 1a and 1b is identified. A circle C which has the largest diameter, passes through the point 1c and is housed within the support portions 1 is drawn. A straight line D having the longest length among straight lines connecting the center P of this circle C and a point 11c on the outer line of the support portion is drawn. When the length of the straight line D is 0.3 $\mu m$ or more, the support portion is judged to be branched. On the other hand, when the length of the straight line D is less than 0.3 $\mu m$, a straight line E having the longest length among straight lines connecting the point 11c and a point 11d on the outer line of the support portion located in a direction away from the center P of the circle C with respect to the point 11c is drawn. When the length of this straight line E is 0.3 $\mu m$ or more, the support portion is judged to be branched. On the other hand, when the length of the straight line E is less than 0.3 $\mu m$, the support portion is judged not to be branched. It is noted that the straight lines D and E are drawn such that they are entirely located within the support portions 1.

The degree of gas permeability of the synthetic resin microporous film is preferably 10 to 150 sec/100 mL/16 $\mu m$, more preferably 30 to 100 sec/100 mL/16 $\mu m$, and particularly preferably 30 to 80 sec/100 mL/16 $\mu m$. The degree of gas permeability of the synthetic resin microporous film falling within the above-described range can provide a synthetic resin miciroporous film having both excellent mechanical strength and ion permeability.

It is noted that the degree of gas permeability of the synthetic resin microporous film is a value measured according to the following procedure. The degree of gas permeability of the synthetic resin microporous film is measured at optional 10 locations under the atmosphere of a temperature of 23° C. and a relative humidity of 65% in accordance with JIS P8117. An arithmetic mean value of the measured values is calculated. The calculated arithmetic mean value is divided by the thickness ($\mu m$) of the synthetic resin microporous film, and the obtained value is multiplied by 16 ($\mu m$). The calculated value (standard value) is a value standardized to be per 16 $\mu m$ in thickness. The obtained standard value is defined as the degree of gas permeability (sec/100 mL/16 $\mu m$) of the synthetic resin microporous film.

The thickness of the synthetic resin microporous film is preferably 5 to 100 $\mu m$, and more preferably 10 to 50 $\mu m$.

It is noted that in the present invention, the thickness of the synthetic resin microporous film can be measured according to the following procedure. That is, the thickness of the synthetic resin microporous film is measured at optional 10 locations using a dial gauge. An arithmetic mean value of the measured values is defined as the thickness of the synthetic resin microporous film.

The porosity of the synthetic resin microporous film is preferably 40 to 70%, and more preferably 50 to 67%. The synthetic resin microporous film having a porosity falling within the above-described range has excellent gas permeability and mechanical strength.

It is noted that the porosity of the synthetic resin microporous film can be measured according to the following procedure. First, the synthetic resin microporous film is cut to obtain a test piece having a planar square shape (area 100 $cm^2$) of 10 cm in length×10 cm in width. Next, the weight W (g) and thickness T (cm) of the test piece are measured to calculate an apparent density $\rho$ (g/$cm^3$) as below. It is noted that the thickness of the test piece is obtained by using a dial gauge (for example, a signal ABS digimatic indicator manufactured by Mitutoyo Corporation) to measure the thickness of the test piece at 15 locations, and calculating an arithmetic mean value of the measured values. Then, this apparent density $\rho$ (g/$cm^3$) and the density $\rho_0$ (g/$cm^3$) of the synthetic resin itself constituting the synthetic resin microporous film can be used to calculate the porosity P(%) of the synthetic resin microporous film according to the following formula.

Apparent density $\rho$(g/$cm^3$)=W/(100×T)

Porosity P[%]=100×[($\rho_0$−$\rho$)/$\rho_0$]

[Manufacturing Method of Synthetic Resin Microporous Film]

The manufacturing method of the synthetic resin microporous film will be described.

The synthetic resin microporous film can be manufactured by a method including the following steps:

an extrusion step of supplying a synthetic resin into an extruder for melting and kneading, and extruding the melted and kneaded synthetic resin from a T die attached to the tip of the extruder to obtain a synthetic resin film;

an aging step of aging the synthetic resin film obtained in the extrusion step for 1 minute or more such that the surface temperature becomes (melting point of synthetic resin—30° C.) to (melting point of synthetic resin—1° C.);

a stretching step of uniaxially stretching the synthetic resin film after the aging step at a strain rate of 10 to 250%/min and a stretching ratio of 1.5 to 2.8 times; and an annealing step of annealing the synthetic resin film after the stretching step. Hereinafter, the manufacturing method of the synthetic resin microporous film will be sequentially described.

(Extrusion Step)

First, the extrusion step of supplying a synthetic resin into an extruder and melting and kneading the synthetic: resin, and extruding the synthetic resin from the T die attached to the tip of the extruder to obtain a synthetic resin film is performed.

The temperature of the synthetic resin when the synthetic resin is melted and kneaded by the extruder is preferably (melting point of synthetic resin+20° C.) to (melting point of synthetic resin+100° C.), and more preferably (melting point of synthetic resin+25° C.) to (melting point of synthetic resin+80° C.). The temperature of the synthetic resin falling within the above-described range can improve the orientation properties of the synthetic resin and highly form lamellae of the synthetic resin.

The draw ratio when the synthetic resin is extruded from the extruder into a film shape is preferably 50 to 300, more preferably 55 to 280, particularly preferably 65 to 250, and most preferably 70 to 250. The draw ratio of 50 or more can sufficiently orient molecules of the synthetic resin, so that lamellae of the synthetic resin can be sufficiently generated. The draw ratio of 300 or less can improve the film formation stability of the synthetic resin film, and improve the thickness accuracy and width accuracy of the synthetic resin film.

It is noted that the draw ratio refers to a value obtained by dividing the clearance of the lip of the T die by the thickness of the synthetic resin film extruded from the T die. The clearance of the lip of the T die can be obtained by measuring the clearance of the lip of the T die at 10 or more locations using a feeler gauge (for example, a JIS feeler gauge manufactured by Nagai Gauge Seisakusho) in accordance with JIS B7524, and calculating an arithmetic mean value of the measured values. The thickness of the synthetic resin film extruded from the T die can be obtained by measuring the thickness of the synthetic resin film extruded from the T die at 10 or more locations using a dial gauge (for example, a signal ABS digimatic indicator manufactured by Mitutoyo Corporation), and calculating an arithmetic mean value of the measured values.

The film forming rate of the synthetic resin film is preferably 10 to 300 m/min, more preferably 15 to 250 m/min, and particularly preferably 15 to 30 m/min. The film forming rate of the synthetic resin film being 10 m/min or more can sufficiently orient, molecules of the synthetic resin, so that lamellae of the synthetic resin can be sufficiently generated. Also, the film forming rate of the synthetic resin film being 300 m/min or less can improve the film formation stability of the synthetic resin film, and improve the thickness accuracy and width accuracy of the synthetic resin film.

The synthetic resin film extruded from the T die is preferably cooled until the surface temperature becomes equal to or lower than (melting point of synthetic resin—100° C.). This can promote the crystallization of the synthetic resin and the generation of lamellae. The melt-kneaded synthetic resin is extruded to orient the synthetic resin molecules forming the synthetic resin film in advance. The synthetic resin film with this state is then cooled to promote, the production of lamellae in a portion where the synthetic resin is oriented.

The surface temperature of the cooled synthetic resin film is preferably equal to or lower than a temperature that, is lower by 100° C. than the melting point of the synthetic resin, more preferably a temperature that is lower by 140 to 110° C. than the melting point of the synthetic resin, and particularly preferably a temperature that is lower by 135 to 120° C. than the melting point of the synthetic resin. The surface temperature of the cooled synthetic resin film being equal to or lower than a temperature that, is lower by 100° C. than the melting point of the synthetic resin can sufficiently generate lamellae of the synthetic resin constituting the synthetic resin film.

(Aging Step)

Next, the synthetic resin film obtained by the above-described extrusion step is aged. This aging step of the synthetic resin film is performed for growing the lamellae generated in the synthetic resin film during the extrusion step. This can form a laminated lamellae structure in which a crystallized portion (lamellae) and an amorphous portion are alternately arranged in the extrusion direction of the synthetic resin film. In the later-described stretching step of the synthetic resin film, a crack is caused to occur not in the lamella but between the lamellae. Furthermore, starting from this crack, a minute through hole (micropore portion) can be formed.

The aging temperature of the synthetic resin film is preferably (melting point of synthetic resin—30° C.) to (melting point of synthetic resin—1° C.), and more preferably (melting point of synthetic resin—25° C.) to (melting point of synthetic resin—5° C.). The aging temperature of the synthetic resin film being equal to or higher than (melting point of synthetic resin—30° C.) can sufficiently orient molecules of the synthetic resin and sufficiently grow lamellae. Also, the aging temperature of the synthetic resin film being equal to or lower than (melting point of synthetic resin—1° C.) can sufficiently orient molecules of the synthetic resin and sufficiently grow lamellae. It is noted that the aging temperature of the synthetic resin film refers to the surface temperature of the synthetic resin film.

The aging time of the synthetic resin film is preferably 1 minute or more, more preferably 3 minutes or more, particularly preferably 5 minutes or more, and most preferably 10 minutes or more. The aging of the synthetic resin film performed for 1 minute or more can sufficiently and uniformly grow lamellae of the synthetic resin film. The excessively long aging time may cause the synthetic resin film to be thermally deteriorated. Therefore, the aging time is preferably 30 minutes or less, and more preferably 20 minutes or less.

(Stretching Step)

Next, the stretching step of uniaxially stretching the synthetic resin film after the aging step is performed. In the stretching step, the synthetic resin film is preferably uniaxially stretched only in the extrusion direction.

The stretching method of the synthetic resin film in the stretching step is not particularly limited as long as the synthetic resin film can be uniaxially stretched. An example thereof may include a method of uniaxially stretching the synthetic resin film at a prescribed temperature using a uniaxially stretching apparatus. The stretching of the synthetic resin film is preferably performed by sequential stretching of performing stretching multiple times in a divided manner. The sequential stretching improves the degree of gas permeability or porosity of the obtained synthetic resin microporous film.

The strain rate when the synthetic resin film is stretched is preferably 10 to 250%/min, more preferably 30 to 245%/min, and particularly preferably 35 to 240%/min. When the strain rate during the stretching of the synthetic resin film is adjusted to fall within the above-described range, a crack is not irregularly generated between lamellae, but is regularly generated between lamellae which are arranged at a prescribed interval in the stretching direction of the synthetic resin film and which are placed on an imaginary line extending in the thickness direction of the synthetic resin film. Therefore, the synthetic resin microporous film includes support portions extending roughly in the thickness direction and micropore portions continuously and linearly formed in the thickness direction to the extent possible. The strain rate when the synthetic resin film is stretched refers to a value calculated according to the following formula. It is noted that the strain rate refers to a deformation strain per unit time $\varepsilon$ [%/min], which is calculated on the basis of a stretching ratio $\lambda$ [%], a line conveying rate V [m/min], and a stretch section length F [m]. The line conveying rate V refers to a conveying rate of the synthetic resin film at the entrance of the stretch section. The stretch section length F refers to a conveying distance from the entrance to the exit of the stretch section.

Strain rate $\varepsilon = \lambda \times V/F$

In the stretching step, the surface temperature of the synthetic resin film is preferably (melting point of synthetic resin—100° C.) to (melting point of synthetic resin—5° C.), and more preferably (melting point of synthetic resin—30° C.) to (melting point of synthetic resin—10° C. The surface temperature falling within the above-described range can smoothly generate a crack in an amorphous portion between lamellae and produce a micropore portion, without breaking the synthetic resin film.

In the stretching step, the stretching ratio of the synthetic resin film is preferably 1.5 to 2.8 times, and more preferably 2.0 to 2.6 times. The stretching ratio falling within the above-described range can uniformly form the micropore portions in the synthetic resin film.

It is noted that, the stretching ratio of the synthetic resin film refers to a value obtained by dividing the length of the synthetic resin film after stretching by the length of the synthetic resin film before stretching.

(Annealing Step)

Next, the annealing step of performing an annealing treatment to the synthetic resin film after the stretching step is performed. This annealing step is performed for relieving the residual strain generated in the synthetic resin film due to the stretch applied in the above-described stretching step to prevent the obtained synthetic resin microporous film from being thermally shrunk by heating.

The surface temperature of the synthetic resin film in the annealing step is preferably (melting point of synthetic resin film—30° C.) to (melting point of synthetic resin—5° C). A low surface temperature sometimes causes the strain remaining in the synthetic resin film to be insufficiently relieved, which may reduce size stability when the synthetic resin microporous film obtained is heated. Also, a high surface temperature sometimes causes the micropore portions formed in the stretching step to be blocked.

The shrinkage irate of the synthetic resin film in the annealing step is preferably 30% or less. A high shrinkage rate sometimes causes slack in the synthetic resin film, which inhibits uniform annealing, or prevents the shape of the micropore portion to be maintained.

It is noted that the shrinkage rate of the synthetic resin film refers to a value obtained by dividing the shrinkage length of the synthetic resin film in the stretching direction during the annealing step by the length of the synthetic resin film in the stretching direction after the stretching step, and multiplying the calculated value by 100.

Advantageous Effects of Invention

Since the synthetic resin microporous film of the present invention includes the micropore portions which are roughly linearly and continuously formed in the thickness direction, between the support portions which roughly linearly extend, it can smoothly transmit ions such as lithium ions. Therefore, the use of such a synthetic resin microporous film as, for example, a separator for power storage devices enables ions to smoothly pass through the synthetic resin microporous film. Accordingly, a power storage device having high power can be provided.

Furthermore, the synthetic resin microporous film of the present invention includes the support portions which are linearly formed in the thickness direction without having branch structures to the extent possible, it is excellent in mechanical strength particularly in the thickness direction. Therefore, the synthetic resin microporous film is not crushed in the thickness direction due to the compressive force applied when in use, and the micropore portions formed therein are inhibited from being blocked. Thus, the synthetic resin microporous film maintains excellent gas permeability for an extended period.

DESCRIPTION OF EMBODIMENTS

Although examples of the present invention will foe described below, the present invention is not limited by these examples.

Examples 1 to 6, Comparative Example 1

(Extrusion Step)

A homopolypropylene having a weight-average molecular weight, number-averaged molecular weight, and melting point indicated in Table 1 was supplied into an extruder, melted and kneaded at a resin temperature indicated in Table 1, and extruded from a T die attached to the tip of the extruder into a film shape. Thereafter, the extruded product was cooled until the surface temperature thereof became 30° C. to obtain a long-length homopolypropylene film having a thickness of 30 μm and a width of 200 mm. It is noted that the film forming rate, extrusion amount, and draw ratio were as indicated in Table 1.

(Aging Step)

Next, the homopolypropylene film was aged for a time (aging time) indicated in Table 1 such that the surface temperature thereof became an aging temperature indicated in Table 1.

(Stretching Step)

Next, using a uniaxially stretching apparatus, the aged homopolypropylene film was uniaxially stretched only in the extrusion direction at a strain rate indicated in Table 1 and a stretching ratio indicated in Table 1 such that the surface temperature thereof became a temperature indicated in Table 1.

(Annealing Step)

Thereafter, the homopolypropylene film was supplied into a hot air furnace, and traveled for 1 minute while tension was not applied to the homopolypropylene film, such that the surface temperature of the homopolypropylene film became 130° C. In this manner, the homopolypropylene film was annealed to obtain a long-length homopropylene microporous film having a thickness of 25 μm. It is noted that the shrinkage rate of the homopolypropylene film in the annealing step was a value indicated in Table 1.

[Evaluation]

For the obtained homopolypropylene microporous film, the number of branch structures of the support portions per 100 μm$^2$ was measured according to the above-described procedure. The results are shown in Table 1.

For the obtained homopolypropylene microporous film, the degree of gas permeability, shrinkage rate (90° C. and 120° C.), porosity, and thickness were measured. The results are shown in Table 1.

For the obtained homopolypropylene microporous film, the DC resistance and dendrite resistance were measured. The results are shown in Table 1.

Figure 1:
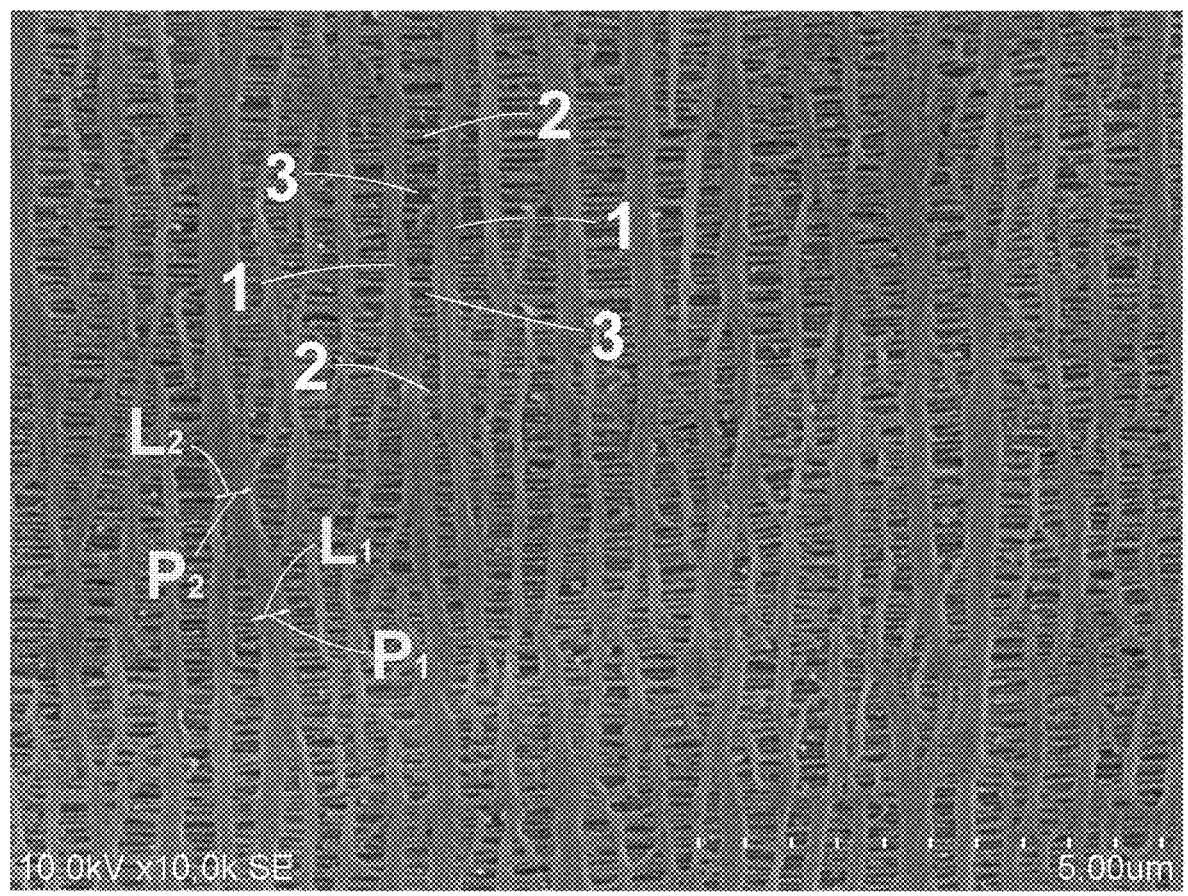
FIG. 1 is an enlarged photograph of a cross section along a thickness direction and a stretching direction of a synthetic resin microporous film (homopolypropylene microporous film) manufactured in Example 1.
Figure 2:
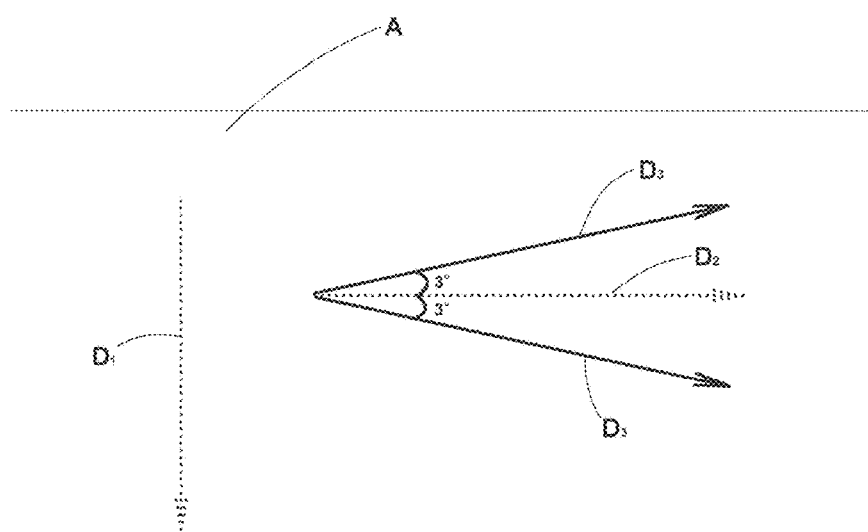
FIG. 2 is a schematic view illustrating the concept of directions in judging whether or not it is a fibril.
Figure 3:
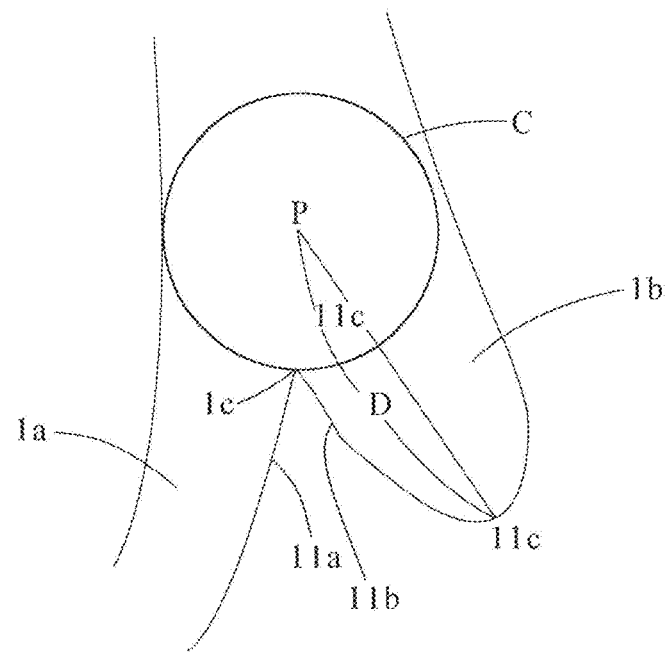
FIG. 3 is a schematic view illustrating a procedure for judging whether or not support portions are branched from each other.
Figure 4:
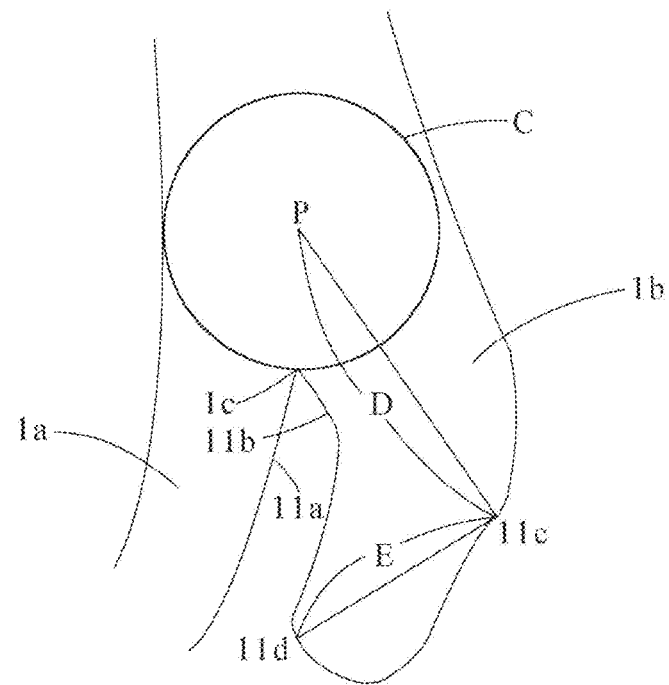
FIG. 4 is a schematic view illustrating a procedure for judging whether or not support portions are branched from each other.
Figure 5:
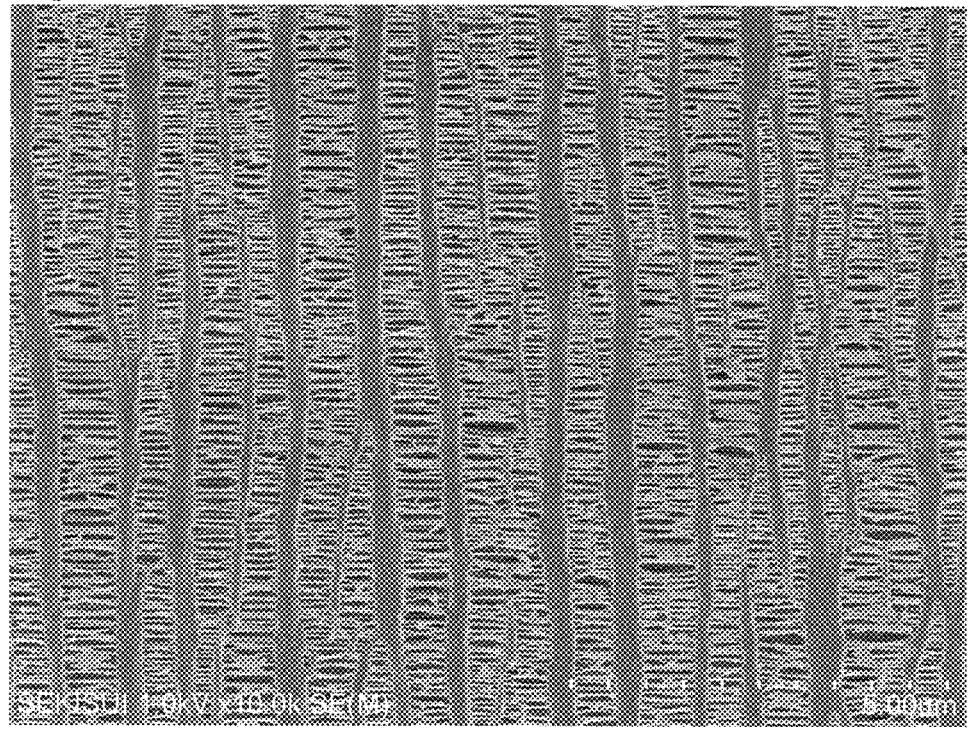
FIG. 5 is an enlarged photograph of a cross section along a thickness direction and a stretching direction of a synthetic resin microporous film (homopolypropylene microporous film) manufactured in Example 1.

For the homopolypropylene microporous film manufactured in Example 1, an enlarged photograph at a magnification of 10,000 times of a cross section along a thickness direction and a stretching direction is shown in FIG. 5.

Figure 6:
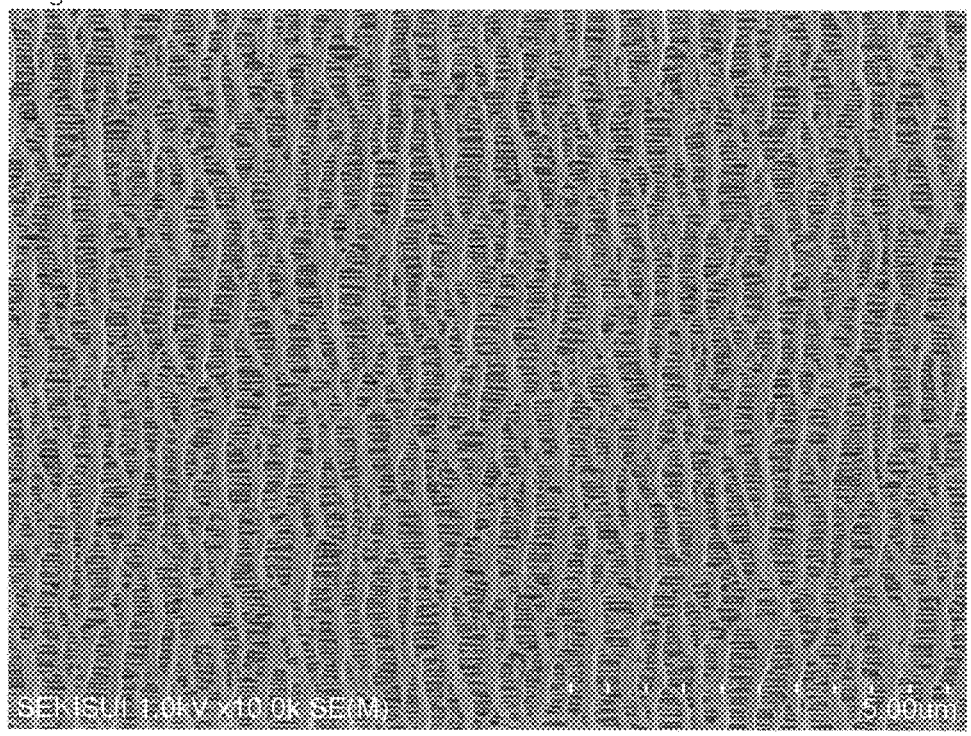
FIG. 6 is an enlarged photograph of a cross section along a thickness direction and a stretching direction of a synthetic resin microporous film (homopolypropylene microporous film) manufactured in Comparative Example 1.

For the homopolypropylene microporous film manufactured in Comparative Example 1, an enlarged photograph at a magnification of 10,000 times of a cross section along a thickness direction and a stretching direction is shown in FIG. 6.

(Shrinkage Rate)

The shrinkage rate at 90° C. and 120° C. of homopolypropylene was measured according to the following procedure. A test piece was prepared by cutting out the homopolypropylene microporous film at room temperature into a square of 12 cm×12 cm such that one side became parallel to the MD direction (extrusion direction). A straight line having a length of 10 cm was drawn parallel to the MD direction (extrusion direction) on the center section of the test piece. While the test piece was inserted between two pieces of blue plate float glass having a planar rectangular shape with a 15 cm side and having a thickness of 2 mm for stretching the wrinkles of the test piece, the length of the straight line was read to the 1/10 μm place at room temperature (25° C.) using a two-dimensional length measuring machine (trade name "CW-2515N" manufactured by Chien Wei Precise Technology Co., Ltd.). The read length of the straight line was defined as an initial length $L_3$. Next, the test, piece was stored in a constant temperature bath (trade name "OF-450B" manufactured by AS One Corporation) having been set to become 90° C. or 120° C. for one week, and thereafter removed. The length of the straight line of the test, piece after heating was read to the 1/10 μm place at room temperature (25° C.) using a two-dimensional length measuring machine (trade name "CW-2515N" manufactured by Chien Wei Precise Technology Co., Ltd.). The read length of the straight line was defined as a length after heating $L_4$. According to the following formula, the shrinkage rate at 90° C. or 120° C. was calculated.

Shrinkage rate (%)=100×[(initial length $L_3$)−(length after heating $L_4$)]/(initial length $L_3$)

(DC Resistance)

A positive electrode and a negative electrode were prepared according to the following procedure to produce a small battery. The DC resistance of the obtained small battery was measured.

<Production Method of Positive Electrode>

In an Ishikawa grinding mortar, $Li_2CO_3$ and a coprecipitated hydroxide represented by $Ni_{0.5}Co_{0.2}Mn_{0.3}(OH)_2$ were mixed such that the molar ratio of Li and the whole transition metal became 1.08:1. Thereafter, the mixture was subjected to a heat treatment in the air atmosphere at 950° C. for 20 hours, and thereafter pulverized. Accordingly, $Li_{1.04}Ni_{0.5}Co_{0.2}Mn_{0.3}O_2$ having an average secondary particle diameter of about 12 μm was obtained as a positive electrode active material.

The positive electrode active material obtained as described above, acetylene black (trade name "HS-100" manufactured by Denki Kagaku Kogyo Kabushiki Kaisha) as a conductive auxiliary, and polyvinylidene fluoride (trade name "#7208" manufactured by Kureha Corporation) as a binder were mixed at a ratio of 91:4.5:4.5 (% by mass). This mixture was poured and mixed into N-methyl-2-pyrrolidone to produce a slurry solution. This slurry solution was applied onto an aluminum foil (manufactured by Toyo Tokai Aluminium Hanbai K.K., thickness: 20 μm) by a doctor blade method, and dried. The mixture applying amount was 1.6 g/cm$^3$. The aluminum foil was pressed tor cutting. Accordingly, a positive electrode was produced.

<Production Method of Negative Electrode>

Lithium titanate (trade name "XA-105" manufactured by Ishihara Sangyo Kaisha, Ltd., median diameter: 6.7 μm), acetylene black (trade name "HS-100" manufactured by Denki Kagaku Kogyo Kabushiki Kaisha) as a conductive auxiliary, and polyvinylidene fluoride (trade name "#7208" manufactured by Kureha Corporation) as a binder were mixed at a ratio of 90:2:8 (% by mass). This mixture was poured and mixed into N-methyl-2-pyrrolidone to produce a slurry solution. This slurry solution was applied onto an aluminum foil (manufactured by Toyo Tokai Aluminium Hanbai K.K., thickness: 20 μm) by a doctor blade method, and dried. The mixture applying amount was 2.0 g/cm$^2$. The aluminum foil was pressed for cutting. Accordingly, a negative electrode was produced.

<Measurement of DC Resistance>

The positive electrode and the negative electrode were punched into a circular shape having a diameter of 14 mm and 15 mm, respectively. A small battery was constituted by impregnating the synthetic resin microporous film with an electrolytic solution while the synthetic resin microporous film was placed between the positive electrode and the negative electrode.

The used electrolytic solution was obtained by dissolving lithium hexafluorophosphate ($LiPF_6$) in a mixed solvent containing ethylene carbonate (EC) and diethyl carbonate (DEC) at a volume ratio of 3:7 to become a 1 M solution.

The small battery was charged at a current density of 0.20 mA/cm$^2$ to a previously determined upper limit voltage. The small battery was discharged at a current density of 0.20 mA/cm$^2$ to a previously determined lower limit voltage. The upper limit voltage was 2.7 V, and the lower limit voltage was 2.0 V. The discharge capacity obtained in the first cycle was defined as the initial capacity of the battery. Thereafter, the battery was charged to 30% of the initial capacity. Then, a voltage ($E_1$) when the battery was discharged at 60 mA ($I_1$) for 10 seconds and a voltage ($E_2$) when the battery was discharged at 144 mA ($I_2$) for 10 seconds were measured.

The measured values were used to calculate a DC resistance value (Rx) at 30° C. according to the following formula.

$$Rx = |(E_1 - E_2)/\text{discharge current } (I_1 I_2)|$$

(Dendrite Resistance)

After a positive electrode and a negative electrode were prepared according to the following condition, a small battery was produced. The dendrite resistance of the obtained small battery was evaluated. The dendrite resistance was evaluated according to the following procedure. Three small batteries were prepared under an identical condition. As a result of the following evaluation, when all batteries did not have a short circuit, it was rated as A. When one had a short circuit, it was rated as B. When two or more had a short circuit, it was rated as C.

<Production Method of Positive Electrode>

In an Ishikawa grinding mortar, $Li_2CO_3$ and a coprecipitated hydroxide represented by $Ni_{0.33}Co_{0.33}Mn_{0.33}(OH)_2$ were mixed such that the molar ratio of Li and the whole transition metal became 1.08:1. Thereafter, the mixture was subjected to a heat treatment in the air atmosphere at 950° C. for 20 hours, and thereafter pulverized. Accordingly, $Li_{1.04}Ni_{0.33}Co_{0.33}Mn_{0.33}O_2$ having an average secondary particle diameter of about 12 μm was obtained as a positive electrode active material.

The positive electrode active material obtained as described above, acetylene black (HS-100 manufactured by Denki Kagaku Kogyo Kabushiki Kaisha) as a conductive auxiliary, and polyvinylidene fluoride (#7208 manufactured by Kureha Corporation) as a binder were mixed at a ratio of 92:4:4 (% by mass). This mixture was poured and mixed into N-methyl-2-pyrrolidone to produce a slurry solution. This slurry was applied onto an aluminum foil (manufactured by Toyo Tokai Aluminium Hanbai K.K., thickness: 15 μm) by a doctor blade method, and dried. The mixture applying amount was 2.9 g/cm³. Thereafter, the aluminum foil was pressed to produce a positive electrode.

<Production Method of Negative Electrode>

Natural graphite (average particle diameter 10 μm) as a negative electrode active material, acetylene black (trade name "HS-100" manufactured by Denki Kagaku Kogyo Kabushiki Kaisha) as a conductive auxiliary, and polyvinyldene fluoride (trade name "#7208" manufactured by Kureha Corporation) as a binder were mixed at a ratio of 95.7:0.5:3.8 (% by mass). To this mixture, N-methyl-2-pyrrolidone was further poured and mixed. Accordingly, a slurry solution was produced. The resulting slurry was applied onto a rolled copper foil (manufactured by UACJ Foil Corporation, thickness 10 μm) by a doctor blade method, and dried. The mixture applying amount was 1.5 g/cm³. Thereafter, the rolled copper foil was pressed to produce a negative electrode.

<Measurement of Dendrite Resistance>

The positive electrode and the negative electrode were punched out into a circular shape having a diameter of 14 mm and 15 mm, respectively, to produce electrodes. A small battery was constituted by impregnating the homopolypropylene microporous film with an electrolytic solution while the homopolypropylene microporous film was placed between the positive electrode and the negative electrode. It is noted that the used electrolytic solution was obtained by dissolving lithium hexafluorophosphate ($LiPF_6$) in a mixed solvent containing ethylene carbonate (EC) and diethyl carbonate (DEC) at a volume ratio of 3:7 to become a 1 M solution. The small battery was charged at a current density of 0.2 mA/cm² to a previously determined upper limit voltage of 4.6 V. The small battery was placed in a blast oven at 60° C., and the voltage change was observed for 6 months. Whether or not a short circuit occurred due to a dendrite was judged as follows. That is, when the voltage change of the small battery was −Δ0.5 V/min or more, it was judged that an internal short circuit occurred due to the generation of a dendrite.

TABLE 1

| | | Example | | | | | | Comparative Example |
|---|---|---|---|---|---|---|---|---|
| | | 1 | 2 | 3 | 4 | 5 | 6 | 1 |
| Homopolypropylene | Weight-Average Molecular Weight Mw | 413,000 | 413,000 | 413,000 | 413,000 | 371,000 | 427,000 | 413,000 |
| | Number-Average Molecular Weight Mn | 44,300 | 44,300 | 44,300 | 44,300 | 43,200 | 45,100 | 44,300 |
| | Molecular Weight Distribution (Mw/Mn) | 9.3 | 9.3 | 9.3 | 9.3 | 8.6 | 9.5 | 9.3 |
| | Melting Point (° C.) | 163 | 163 | 163 | 163 | 165 | 165 | 163 |
| Extrusion Step | Resin Temperature (° C.) | 220 | 220 | 220 | 220 | 220 | 220 | 220 |
| | Film Forming Rate (m/min) | 22 | 22 | 18 | 32 | 22 | 22 | 22 |
| | Extrusion Amount (Kg/hour) | 12 | 12 | 12 | 12 | 12 | 12 | 12 |
| | Draw Ratio | 70 | 70 | 55 | 70 | 70 | 70 | 70 |
| Aging Step | Aging Temperature (° C.) | 147 | 147 | 148 | 147 | 147 | 147 | 147 |
| | Aging Time (minutes) | 10 | 10 | 12 | 10 | 10 | 10 | 10 |
| Stretching Step | Surface Temperature (° C.) | 140 | 140 | 140 | 140 | 140 | 140 | 140 |
| | Stretching Ratio (times) | 2.5 | 2.5 | 2.5 | 2.5 | 2.5 | 2.5 | 3.2 |
| | Strain Rate (%/min) | 80 | 240 | 240 | 40 | 240 | 240 | 206 |
| Annealing Step | Shrinkage Rate (%) | 14 | 14 | 14 | 14 | 14 | 14 | 7 |
| Homopolypropylene Microporous Film | Number of Branch Structures (/100 mm²) | 32 | 15 | 83 | 17 | 48 | 66 | 221 |
| | Degree of Gas Permeability (sec/100 mL/16 μm) | 48 | 63 | 80 | 37 | 58 | 72 | 96 |
| | Shrinkage Rate 90° C. | 1.0 | 1.2 | 1.2 | 0.9 | 1.0 | 2.0 | 5.0 |
| | 120° C. | 9.4 | 5.8 | 5.2 | 9.6 | 8.7 | 12.3 | 15.2 |

TABLE 1-continued

|  |  | Example | | | | | | Comparative Example |
|---|---|---|---|---|---|---|---|---|
|  |  | 1 | 2 | 3 | 4 | 5 | 6 | 1 |
| Evaluation | Porosity (%) | 56 | 56 | 54 | 56 | 56 | 57 | 62 |
|  | Thickness (μm) | 16 | 16 | 20 | 16 | 16 | 16 | 16 |
|  | DC Resistance (Ω) | 1.68 | 1.73 | 1.76 | 1.71 | 1.72 | 1.75 | 1.82 |
|  | Dendrite Resistance | B | A | A | B | A | A | C |

INDUSTRIAL APPLICABILITY

The synthetic resin microporous film of the present invention can smoothly and uniformly transmit ions such as lithium ions, sodium ions, calcium ions, and magnesium ions. Therefore, the synthetic resin microporous film is suitably used as a separator for power storage devices.

CROSS-REFERENCE TO RELATED APPLICATION

The present application claims the priority under Japanese Patent Application No. 2017-22339 filed on Feb. 9, 2017, the disclosure of which is hereby incorporated in its entirety by reference.

REFERENCE SIGNS LIST 1 support portion
2 fibril
3 micropore portion
A synthetic resin microporous film

The invention claimed is:

1. A synthetic resin microporous film comprising a synthetic resin, the synthetic resin microporous film being stretched,
    the synthetic resin microporous film having, in a cross section along a thickness direction and a stretching direction of the synthetic resin microporous film;
    a plurality of support portions extending in the thickness direction of the synthetic resin microporous film;
    a plurality of fibrils formed between the support portions; and
    the support portions having the number of branch structures of 150 or less per 100 $\mu m^2$;
    the synthetic resin micro porous film being configured such that micropore portions are formed in areas surrounded by the support portions and the fibrils; and
    the synthetic resin microporous film having a degree of gas permeability of 30 sec/100 mL/16 μm or more and 80 sec/100 mL/16 μm or less; and a porosity is 40% or more and 70% or less.

2. The synthetic resin microporous film according to claim 1, wherein the synthetic resin includes an olefin-based resin.

3. A separator for a power storage device comprising the synthetic resin microporous film according to claim 1.

4. A power storage device comprising the separator for a power storage device according to claim 3.

5. A method of manufacturing the synthetic resin microporous film according to claim 1, comprising:
    an extrusion step of supplying a synthetic resin into an extruder for melting and kneading, and extruding the melted and kneaded synthetic resin from a T die attached to a tip of the extruder to obtain a synthetic resin film;
    an aging step of aging the synthetic resin film obtained in the extrusion step for 1 minute or more such that a surface temperature of the synthetic resin film is in a range from 30° C. less than a melting point of the synthetic resin to 1° C. less than the melting point of the synthetic resin;
    a stretching step consisting of a step of uniaxially stretching the synthetic resin film after the aging step at a strain rate of 10%/min or more and 250%/min or less and a stretching ratio of 1.5 to 2.8 times; and
    an annealing step of annealing the synthetic resin film after the stretching step.

* * * * *